United States Patent
Zalac

(10) Patent No.: US 10,560,563 B1
(45) Date of Patent: Feb. 11, 2020

(54) HAPTIC DEVICE

(71) Applicant: BOUTON SMS INC., Boisbriand (CA)

(72) Inventor: Claude Zalac, Repentigny (CA)

(73) Assignee: BOUTON SMS INC., Boisbriand (CA)

( * ) Notice: Subject to any disclaimer, the term of this patent is extended or adjusted under 35 U.S.C. 154(b) by 0 days.

(21) Appl. No.: 16/452,924

(22) Filed: Jun. 26, 2019

Related U.S. Application Data

(60) Provisional application No. 62/866,565, filed on Jun. 25, 2019.

(51) Int. Cl.
| | |
|---|---|
| *H04L 12/58* | (2006.01) |
| *H04M 1/725* | (2006.01) |
| *G06F 3/0354* | (2013.01) |
| *G06F 3/01* | (2006.01) |
| *G08B 3/10* | (2006.01) |
| *H04W 4/12* | (2009.01) |

(Continued)

(52) U.S. Cl.
CPC ........ *H04M 1/72552* (2013.01); *G06F 3/017* (2013.01); *G06F 3/03547* (2013.01); *G08B 3/105* (2013.01); *G08B 6/00* (2013.01); *G08B 7/06* (2013.01); *H04W 4/12* (2013.01); *H04M 2250/22* (2013.01)

(58) Field of Classification Search
CPC ......... H04M 1/72552; H04M 2250/22; H04M 1/72544; H04M 1/72547; H04M 1/72572; H04M 19/047; H04W 4/12; H04W 4/21; G06F 3/017; G06F 3/03647; G06F 1/1613; G06F 3/016; G06F 3/0346; G06F 3/0488; G06F 3/04842; G06F 3/041; G06F 3/04883; G06F 3/04845; G06F 3/167; G08B 6/00; G08B 7/06; G08B 3/105

USPC ........................ 455/412.1; 348/515; 370/338
See application file for complete search history.

(56) References Cited

U.S. PATENT DOCUMENTS

| | | | |
|---|---|---|---|
| 2010/0045619 A1* | 2/2010 | Birnbaum ............... | H04W 4/21 345/173 |
| 2011/0156494 A1* | 6/2011 | Mashinsky ............. | H02J 17/00 307/104 |

(Continued)

FOREIGN PATENT DOCUMENTS

| | | | | |
|---|---|---|---|---|
| GB | 2475157 A | * | 5/2011 | .......... H04W 28/065 |
| GB | 201611328 | * | 8/2016 | ............... H04B 1/74 |
| WO | WO-2019072512 A1 | * | 4/2019 | ............... G06F 3/01 |

OTHER PUBLICATIONS

Callme Button—MySpool https://myspool.com/?q=content/what-is-callme-button, Publication date: Aug. 19, 2018.

*Primary Examiner* — Mahendra R Patel
(74) *Attorney, Agent, or Firm* — IP Delta Plus Inc.

(57) ABSTRACT

The present haptic device is adapted for sending at least one message. The haptic device comprises a housing, a communication module located inside the housing, a touchpad and a processor. The touchpad is affixed to the housing. The touchpad captures a movement of a user and generates a signal corresponding to the captured movement. The processor is also located inside the housing. The processor receives the signal and instructs the communication module to transmit one of a plurality of stored messages corresponding to the captured movement. The transmitted message includes at least one predetermined recipient address and a message for the recipient.

20 Claims, 7 Drawing Sheets

(51) Int. Cl.
*G08B 7/06* (2006.01)
*G08B 6/00* (2006.01)

(56) References Cited

U.S. PATENT DOCUMENTS

| | | | | |
|---|---|---|---|---|
| 2012/0052900 A1* | 3/2012 | Liu | ................... | H04W 28/0205 |
| | | | | 455/515 |
| 2013/0227411 A1* | 8/2013 | Das | ................... | H04M 3/42042 |
| | | | | 715/702 |
| 2014/0269656 A1* | 9/2014 | Choi | .................... | H04B 7/0617 |
| | | | | 370/338 |
| 2017/0178471 A1* | 6/2017 | Levesque | ............... | A43B 11/00 |
| 2017/0310802 A1* | 10/2017 | Pitts | ........................ | H04W 4/90 |
| 2019/0082475 A1* | 3/2019 | Haverinen | ............ | H04W 76/10 |

\* cited by examiner

| Movement config | Message | Sender's identification | Recipient's Network address | Light config | Sound config |
|---|---|---|---|---|---|
| One tap | Request canceled | IP address | IP address | Green light – 3 seconds | No |
| Two taps | Assistance required | IP address | IP address | Green light - flashing | One note – 2 seconds |
| Swipe down | Cancel previous message | Room # | Cell # | White light – 5 seconds | Three notes sound |
| Swipe right | Ordering product | Account # | Cell# | White light – blinking – 5 seconds | Rushing sound |
| Long tap | URGENT | Room # | Cell # | Red continuous | Voice message "Assistance requested" |

Figure 5

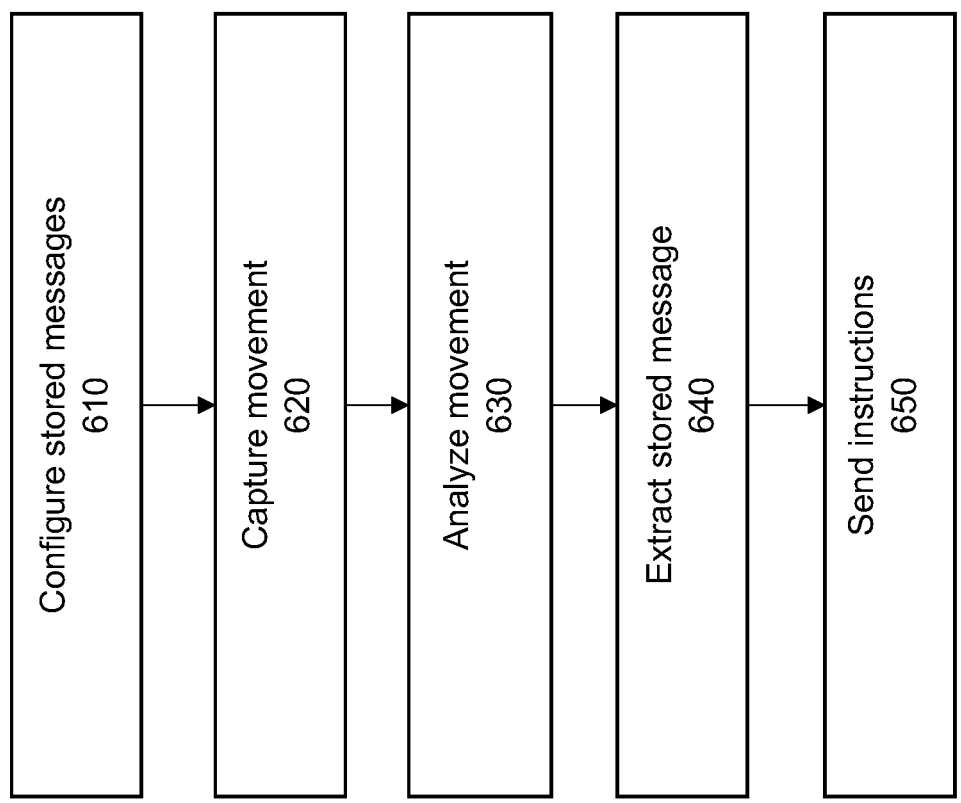

HAPTIC DEVICE

TECHNICAL FIELD

The present disclosure relates to the field of haptic devices, and more particularly to haptic devices for automatically sending a message.

BACKGROUND

With the adoption of the internet and cell phones, it has become easier than ever to obtain assistance in all sorts of situations: from personal to professional needs, a quick internet search followed by an e-mail and/or a phone call often suffice.

However, finding the correct party to contact is often not as simple when faced with a problem in a company. Often times, it is necessary to find the person inside the company that is responsible for handling such requests, following-up with that person, without being allowed to contact directly the supplier or service provider. Furthermore, the urgency and particularity of the issue is sometimes not understood by that person, which results in undue delays and frustration.

There is therefore a need for a new device for efficiently and directly sending a message.

SUMMARY

According to an aspect, the present disclosure relates to a haptic device for sending at least one message. The haptic device comprises a communication module, a touchpad and a processor. The touchpad is affixed to the housing and captures a movement of a user and generates a signal for the captured movement. The processor receives the signal and instructs the communication module to transmit one of a plurality of stored messages corresponding to the captured movement, wherein the one of the stored messages includes at least one predetermined recipient address and a message for the recipient.

BRIEF DESCRIPTION OF THE DRAWINGS

Embodiments of the disclosure will be described by way of example only with reference to the accompanying drawings, in which:

FIG. 5 is an example of a table storing configuration parameters of the present device 100;

FIG. 6 is a flowchart of a method for operating the present haptic device.

DETAILED DESCRIPTION

Figure 1:
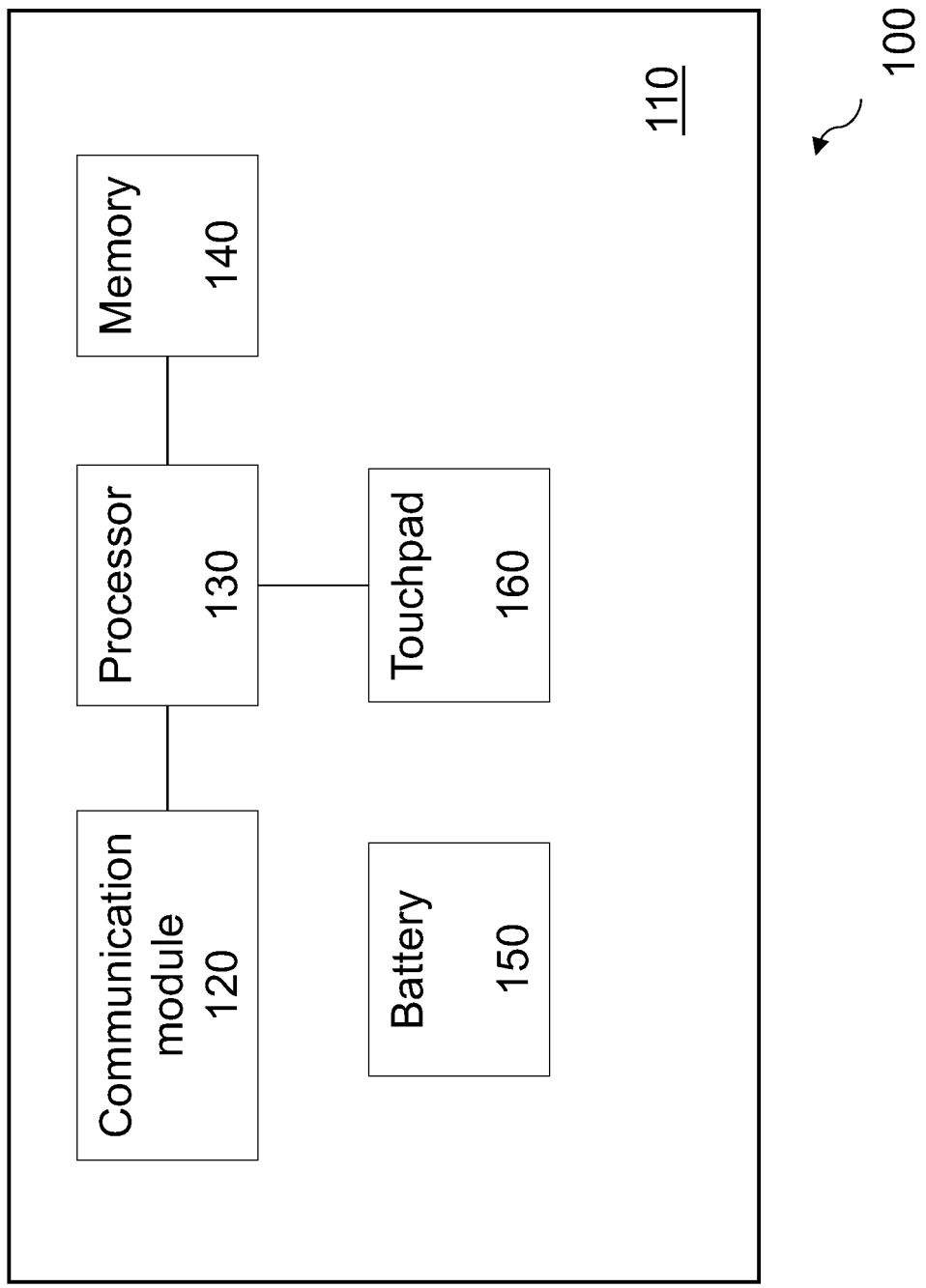
FIG. 1 is a schematic representation of the present haptic device.
Figure 2:
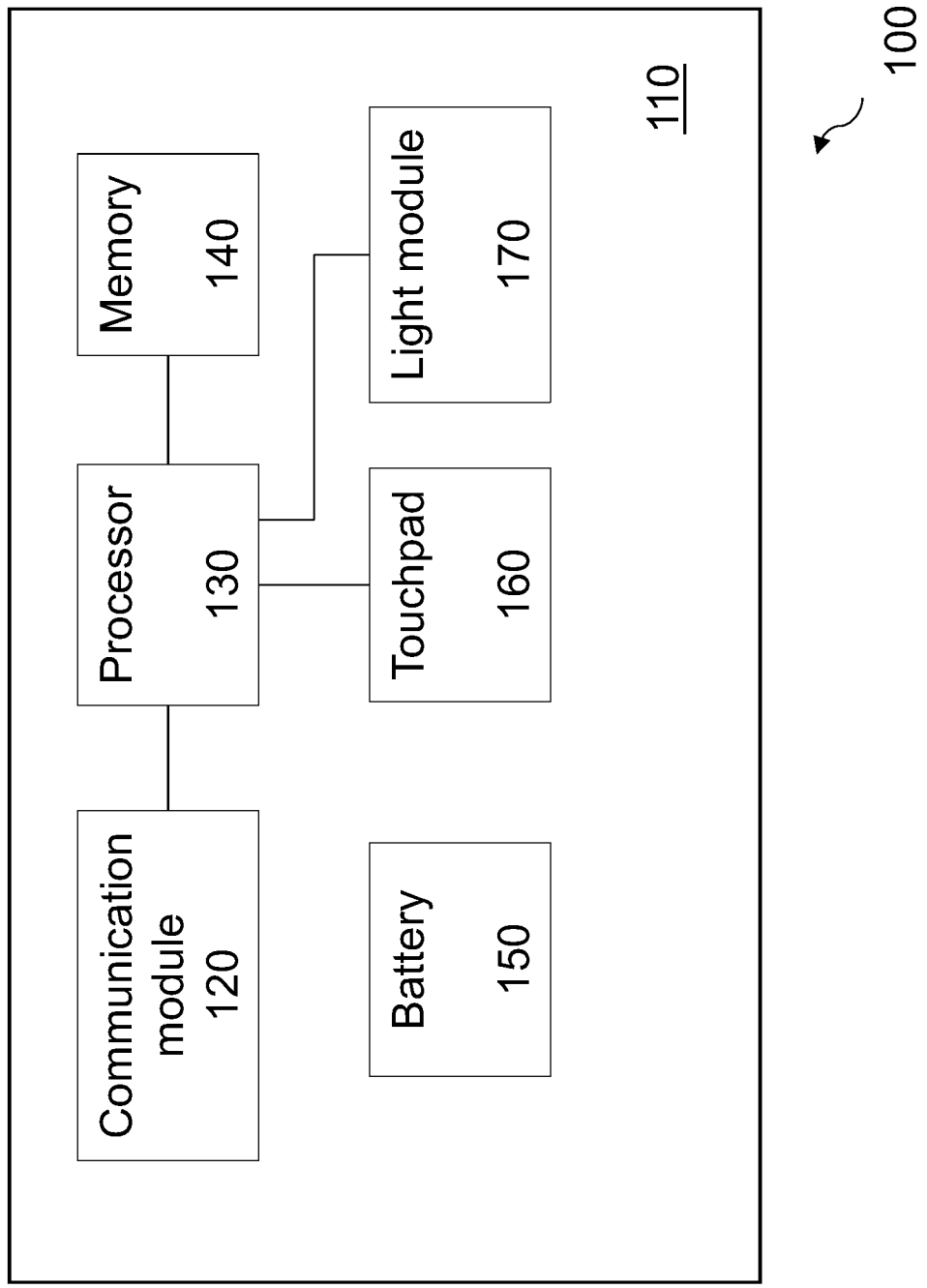
FIG. 2 is a schematic representation of the present haptic device further comprising a light module.
Figure 3:
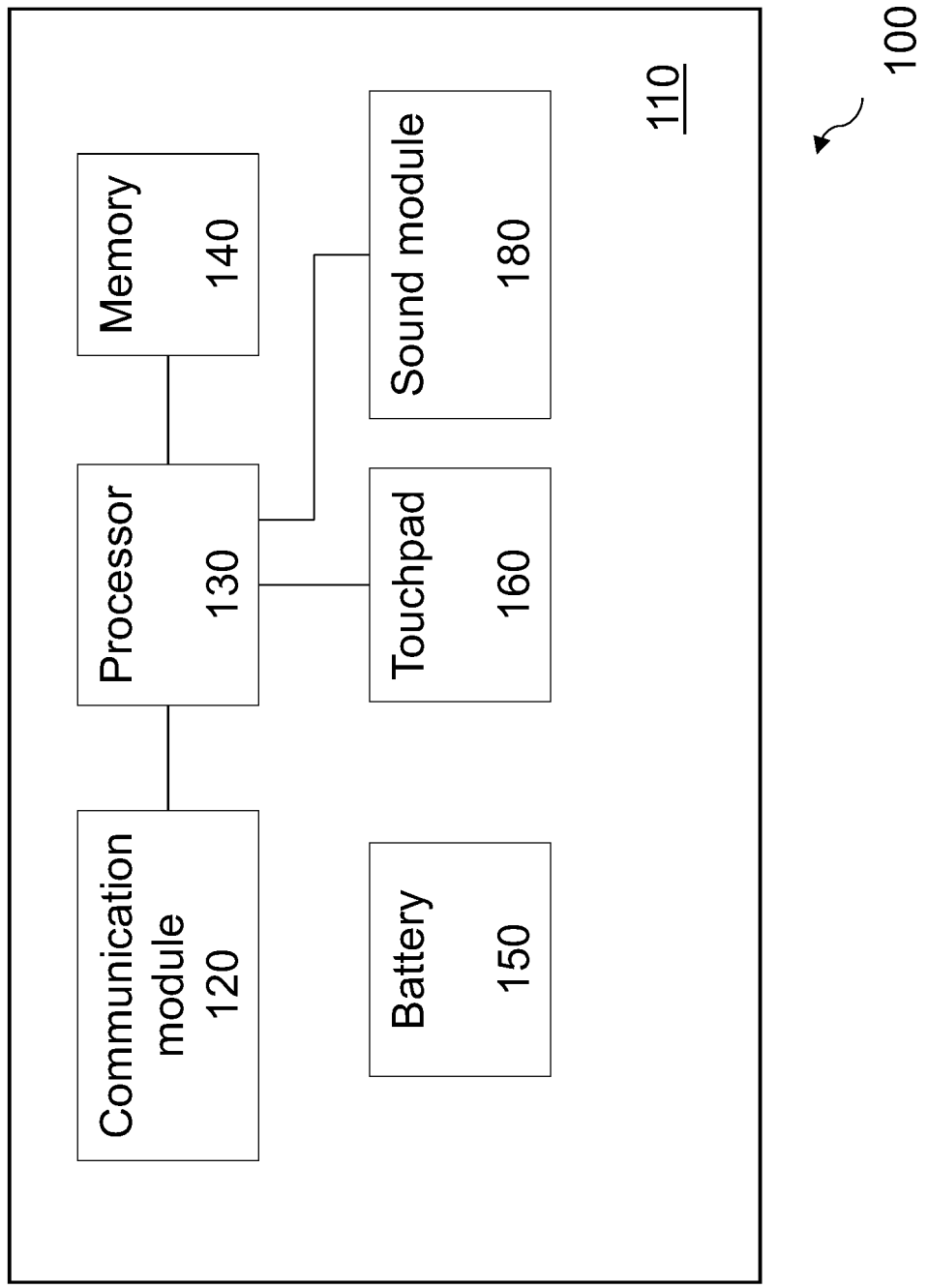
FIG. 3 is a schematic representation of the present haptic device further comprising a sound module.
Figure 4:
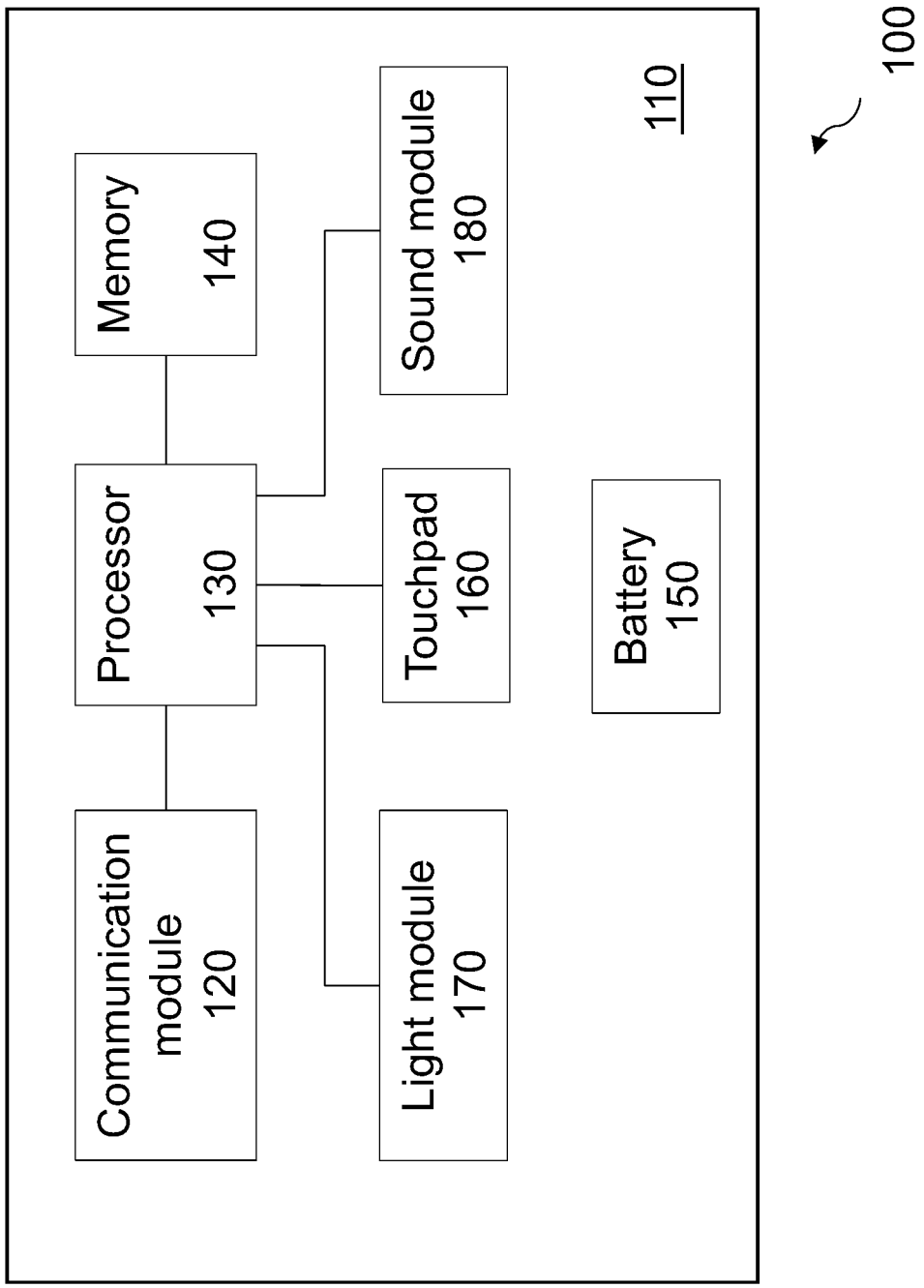
FIG. 4 is a schematic representation of the present haptic device further comprising both a light module and a sound module.

The foregoing and other features will become more apparent upon reading of the following non-restrictive description of illustrative embodiments thereof, given by way of example only with reference to the accompanying drawings. Like numerals represent like features on the various drawings.

Various aspects of the present disclosure generally address a haptic device for sending one of a plurality of stored messages based on a captured movement.

The following terminology is used throughout the present disclosure:

Haptic: subsystem of nonlanguage communication which conveys meaning through physical contact;

Message: an electronic signal comprising multiple fields including a recipient address, a sender address and payload.

Touchpad: an electronic component adapted for capturing a tactile movement.

Referring to FIGS. 1 to 4, there are shown schematic exemplary representations of the present haptic device 100. The haptic device 100 comprises a housing 110, a communication module 120, a processor 130, memory 140, a battery 150 and a touchpad 160. The haptic device 100 may further comprise a light module 170, a sound module 180 or both a light module 170 and a sound module 180.

Housing

The housing 110 may have various shapes. For example, the housing 110 may be cylindrical, cubic, a triangular prism, a hexagonal prism, a cone, of any other shape that three-dimensional shape which provides sufficient interior space for receiving the communication module 120, the processor 130, the memory 140, the battery 150, and the touchpad 160. The housing 110 may be made of any material which does not interfere with the functioning of the communication module 120, the processor 130, the memory 140, the battery 150 and the touchpad 160. For example, the housing 110 may be shaped as cylinder made of plastic. The touchpad 160 may be affixed to the housing 110 or installed inside the housing 110.

The housing 110 may made of a ruggedized material, to be hard-wearing and shock-resistant, so as to allow use of the haptic device 100 in various environments, such as for example an office, a school, a warehouse, a plant, a shopping mall, etc.

The housing 110 houses the communication module 120, the processor 130, the memory 140, and the battery 150. The housing 110 may further comprise additional electronic components used in smart phones, such as a GPS tracker, or an accelerometer. The touchpad 160 may be affixed near or adjacent an exterior surface of the housing 110, replace altogether an entire exterior surface of the housing 110, or replace a section of an exterior surface of the housing 110.

The housing 110 may alternately be made of a translucent or semi-translucent material, so as to allow light generated therein to be seen therethrough. The housing 110 may also be composed of various parts that are secured together, while allowing light generated from inside the housing to seep through some of the various parts thereof.

Communication Module

The communication module 120 is installed in the housing 110 using any means known in the art. The communication module 120 may be affixed to a PCB board (not shown), which fits inside the housing 110 and is secured to the housing 110.

The communication module 120 comprises one or several wireless communication chips adapted for communicating using at least one of the following wireless standards: GSM, 2G, 3G, 4G, 5G, LTE, Wi-Fi, Bluetooth, and Bluetooth Low Energy. The communication module 120 is used for sending one or a plurality of stored messages to one or multiple recipients.

The communication module 120 may further comprise a USB port (not shown) accessible through the housing 110. The USB port may be used for recharging the battery (described further) of the device 100. Alternatively, or concurrently, the USB port may be used for configuring operation of the device 100.

Processor

The processor 130 may be a single processor or a combination of processors. Examples of processors include without limitations: integrated circuit, a digital signal processor, a system on a chip, a field-programmable gate array, an application-specific integrated circuit, or any other type of processor or microprocessor known in the art. The processor 130 is electrically connected to the communication module 120, the memory 140, the touchpad 160, the light module 170, the sound module 180, and any other electronic components such as a GPS and/or an accelerometer, either directly or indirectly, and interacts therewith.

The processor 130 executes instructions for configuring messages to be stored in the memory 140. The processor 130 further executes instructions upon receipt from the touchpad 160 of a signal representative of a movement made by a user as captured by the touchpad 160. The processor 130 further executes instructions for analyzing the signal received from the touchpad 160, to identify a corresponding movement. The processor 130 further extracts from the memory 140 a message corresponding to the captured movement and instructs the communication module 120 to transmit the message corresponding to the captured movement and extracted from the memory 140.

Reference is now concurrently further made to FIG. 5 which is an example of a table storing configuration parameters of the present device 100 stored in the memory 140.

The processor 130 receives from the communication module 130 information for configuring the operation of the haptic device 100. Each haptic device 100 may be configured to correspond to the needs of a particular user, or several haptic devices 100 may be configured identically for use in corporate environments, hospitals, long term care centers, senior homes, schools, public transportation, etc. FIG. 5 provides an example of configuration of the haptic device 100, but many other configurations are possible without departing from the present description.

Typically, the table storing configuration parameters includes for a particular movement, a message to be sent in the form of payload, a sender's identification and a recipient's address (IP address, email address, a cell phone number, etc.) to be contacted. Although only one recipient's address is depicted for each movement in the table of FIG. 5, the haptic device 100 is not limited to such an implementation. For example, the haptic device 100 could be configured, upon capturing a movement on the touchpad 160, to send one message to multiple recipient's addresses (IP address, email address, cell phone number or a combination thereof). Alternatively, the haptic device 100 could be configured, upon capturing a movement on the touchpad 160, to send one message to a recipient's address and concurrently send another message to another recipient's address. An example of such an implementation could automatically send an SMS message to a recipient's cell phone indicating an urgent email to be read, and concurrently sending an email to the recipient's email address with more information.

The movement may be selected from any type of movement which may be captured by the touchpad 160 and recognized by the processor 130. For example, the movement may correspond to any of the following: a single tap (one tap), two consecutive taps or a double tap, three consecutive taps (e.g. a triple tap) made within a predetermined short time interval, a swipe down, a swipe up, a swipe left, a swipe right, a long tap lasting longer than a predetermined longer time interval, an explode movement, a squeeze movement, a diagonal swipe, a multiple finger tap, etc.

The message stored for the movement to be captured may consist of any type of payload that can be wirelessly transmitted to the corresponding recipient. For example, the message may consist of an assistance request, canceling the assistance request, ordering a particular product, ordering a particular service (for example a Uber, a taxi, a meal delivery . . . ), an urgent request, an image, a pictogram, an instruction for another electronic device, etc. The message stored for the movement may further request the processor 130 to include in the message, for example in the payload, GPS coordinates of the haptic device 100 based on a GPS tracker therein, accelerometer measurements, or any other type of data that can be automatically obtained by the processor 130 from any electronic component provided in the haptic device 100.

The sender's identification may be any type of information which is meaningful to the recipient, and not necessarily a sender's routable network address. The sender's identification may be included in the payload and in a format, which is recognizable and meaningful to the recipient. Alternately, each communication module 130 may be provided with a unique sender's routable network address which is translated to the sender's identification by the recipient. For example, the sender's identification may comprise any of the following: an IP address of the sending haptic device 100, an email address, a cell phone number, a room #, an account #, name of an individual, etc.

The recipient's network address is an address which is recognized by the wireless standard used by the communication module 130 for transmitting the message, and the network which carries the message generated by the haptic device 100. For example, the recipient's network address may consist of an IP address, a cell phone number, an Ethernet address, etc.

The configuration parameters may further include a configuration for the light module 170 and/or for the sound module 180. The light configuration and sound configuration provide respectively a visual and an audible feedback to the user of the haptic device 100. Examples of light configurations include: no light, a continuous light for a specific time interval, a flashing light for a specific time interval, and any of the previous configurations in a particular color. Examples of sound configurations include: no sound, a predetermined sound for a specific time interval, a prerecorded voice message, etc.

The processor 130 analyzes the signal received from the touchpad 160 to identify to which message stored in the memory 140 the signal received from the touchpad 160 most probably corresponds. When analysis of the signal received from the touchpad 160 cannot be correlated to one of the movements stored in the memory 140, the processor 130 generates a visual feedback through the light module 170 and/or an audible feedback through the sound module 180 informing the user of the haptic device 100 that the movement the user did on the touchpad 160 could not be correlated to one of the stored movements, and to retry. For example, when the signal received from the touchpad 160 could correspond to more than one movement stored in the memory 140, the processor 130 determines that a correlation could not be performed with enough certainty and actuates one of the light module 170 and/or the sound module 180 to provide visual and/or audible feedback to the user to retry.

The processor 130 correlates the most probable message based on the signal received from the touchpad 160, which may comprise for example variations in pressure and relative position of the pressure variation measured by the touchpad 160. Each movement to be correlated to one of the messages is associated with a set of variations that can be measured by the touchpad 160.

When the processor 130, upon analysis, correlates the signal received from the touchpad 160 to one of the movements stored in the memory 140, the processor 130 retrieves from the memory 140 the corresponding message, sender's identification, recipient's address, light configuration and sound configuration, payload and any other corresponding data to be added by the processor 130. The processor 130 further instructs the communication module 120 to send the message retrieved from the memory 140 to the recipient's address. The processor 130 further actuates the light module 170 and/or the sound module 180 to generate visual/audible feedback as configured.

The processor 130 may further instruct the communication module 120 to transmit the stored message in any communication protocol known, such as for example IPv4, IPv6, Transmission Control Protocol (TCP/IP), User Datagram Protocol (UDP), Post Office Protocol (POP3), Internet Message Access Protocol (IMAP), Simple Mail Transfer Protocol (SMTP), Instant Messaging (IM), Short Message Service (SMS), and Bluetooth network encapsulation protocol (BNEP). For doing so, the processor 130 prepares the message to be sent by the communication module 120 to the most appropriate communication protocol, based on the configuration information stored for the movement in the memory 140, the wireless standard corresponding to the recipient's address and the wireless standards supported by the communication module 120. For example, when multiple messages are to be sent upon detecting a particular movement, the processor 130 instructs the communication module 120 to transmit concurrently a plurality of messages, wherein one of the plurality of messages may be sent by the communication module 120 using one wireless standard and one communication protocol, and another one of the plurality of messages may be sent by the communication module 120 using another wireless standard and the one communication protocol.

Touchpad

The touchpad 160 may be affixed to the housing 110 as an exterior surface of the haptic device 100 surrounded by the remainder of the housing 110, or alternately affixed inside the housing 110.

When the touchpad 160 is affixed to the housing 110 as an exterior surface of the haptic device 100, the touchpad 160 directly detects movements of the users on the touchpad 160.

Figure 7:
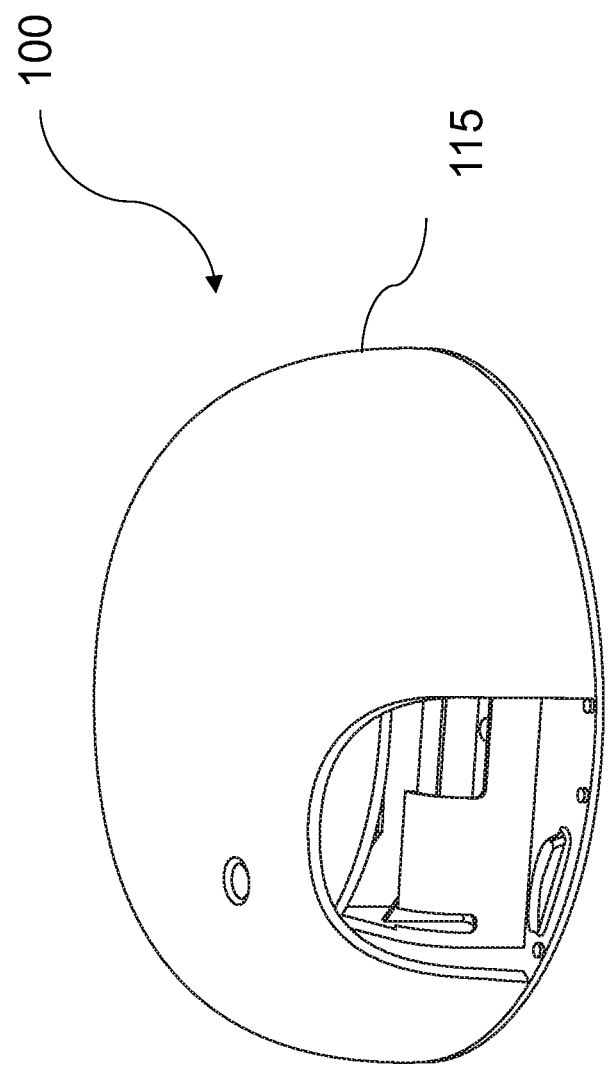
FIG. 7 is a partially open perspective view of an exemplary implementation of the present device 100.

When the touchpad 160 is located inside the housing 110, the housing 110 is further provided with a mobile surface 115 such as the top exterior surface of the housing 110 shown on FIG. 7, which clips with the remainder of the housing 110. The mobile surface 115 moves upon a pressure of the user thereon, and mechanically translates the movement of the user of the mobile surface 115 to the touchpad 160 located thereunder. This implementation protects the touchpad 160, and the mobile surface 115 may be used to display promotional material, instructions on the movements to be made on the mobile surface 115 to generate any of the messages, etc. The mobile surface 115 may be realized using any material known in the art, and the movement of the mobile surface 115 with respect to the touchpad 160 may be controlled by resilience: for example, one or several spring disposed between the mobile surface 115 and the housing 110, a rubber surface between the mobile surface and the housing 110, etc. Resilience prevents the mobile surface 115 to move inadvertently with respect to the touchpad 160, so as to prevent generating and sending messages by accident.

The touchpad 160 detects movements thereon (for example pressure variations and relative position of the pressure variations detected), either directly when the touchpad is affixed to the housing 110 as an exterior surface of the haptic device 100, or indirectly through the movement of the mobile surface 115 of the housing 110 when the touchpad 160 is affixed inside the housing 110. The processor 130 analyzes the signal received from the touchpad 160, and correlates the signal received from the touchpad 160 with one of the messages stored in the memory 140. For doing so, the processor 130 receives from the touchpad 160 a signal representative of the position of a user's finger(s) or of a movement of the user's finger(s) either directly on the touchpad 160 or indirectly as translated by the mobile surface of the housing 110 on the touchpad 160.

The touchpad 160 may be implemented using any type of touch detection mechanism, such as for example a capacitive sensing touchpad or a resistive touchscreen. The touchpad 160 may provide granular or coarse sensing, depending on the environment in which the haptic device 100 is to be used, the number of different movements the haptic device 100 must detect, etc.

Although certain movements are more intuitive than others to users, such as for example a long tap to request immediate assistance, other movements may be less intuitive. To facilitate use of the haptic device 100 in multiple environments, the housing 110 could be provided with some icons depicting which movement to make on the touchpad 160 for sending a specific message. Alternatively, if a resistive touchscreen is used as touchpad 160, the touchscreen could graphically display icons of the movements to be made for each type of pre-configured message.

Light Module

The light module 170 is actuated by the processor 130. The light module 170 may comprise one or several light emitting diode(s) (LED(s)), or any type of light that is compact enough to fit inside the housing 110 and requires very little electricity during operation.

The light module 170 may further comprise a transistor (not shown) or any other electric or electronic component(s) adapted for being controlled by the processor 130, known in the art, and flashing the LED(s).

Sound Module

The sound module 180 is actuated by the processor 130. The sound module includes a digital-to-analog converter and a speaker. The digital-to-analog converter transforms a digital signal received from the processor 130, corresponding to the audible feedback to be provided to the user of the haptic device 100 for the movement captured on the touchpad 160 into a corresponding analog signal to be played by the speaker. The processor 130 thus instructs the sound module 180 to generate a sound corresponding to the captured movement, as configured and stored in the memory 140. The sound module 180 could alternately be implemented with any electric and/or electronic component(s) adapted for providing an audible feedback corresponding to a stored digital sound.

Battery

The haptic device 100 further comprises one or several batteries 150 (hereinafter referred as the battery for simplicity) for powering the communication module 120, the processor 130, the touchpad 160, the light module 170 and the sound module 180. The battery 150 may be rechargeable or non-rechargeable. The battery may further be recharged by means of the USB connector provided in the communication module 120.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A haptic device for sending at least one message, the haptic device comprising:
    a housing;
    a communication module located inside the housing;
    a touchpad affixed to the housing, the touchpad capturing a movement of a user and generating a signal corresponding to the captured movement; and
    a processor located inside the housing, the processor receiving the signal, analyzing the signal to determine a most probable corresponding message, and instructing the communication module to transmit one of a plurality of stored messages corresponding to the captured movement, the one of the stored messages including at least one predetermined recipient address and a message for the recipient, the most probable corresponding message being concurrently transmitted using two different wireless standards.

2. The haptic device of claim 1, wherein the housing covers the touchpad, and the touchpad captures the movement of the user through a mobile surface of the housing.

3. The haptic device of claim 1, wherein the communication module is a wireless communication module adapted for communicating using one or several of the following wireless standards: GSM, 2G, 3G, 4G, 5G, LTE, Wi-Fi, Bluetooth, and Bluetooth Low Energy.

4. The haptic device of claim 3, wherein the communication module allows configuration of each of the stored messages.

5. The haptic device of claim 4, further comprising a memory for storing the stored messages.

6. The haptic device further comprising a light module, and wherein the processor further instructs the light module to generate light corresponding to the stored message.

7. The haptic device of claim 1, further comprising a sound module, and wherein the processor further instructs the sound module to generate sound corresponding to the stored message.

8. The haptic device of claim 1, wherein:
    the touchpad captures at least one of the following movements: a single tap, a double tap, a triple tap, a right swipe, a left swipe, a down swipe, an up swipe, a squeeze tap, and an explode tap;
    the processor receives the captured movement and instructs the communication module to transmit the one of the stored messages to one or several recipients based on the captured movement.

9. The haptic device of claim 1, wherein the touchpad is one of a capacitive sensing touchpad and a resistive touchscreen.

10. The haptic device of claim 3, wherein the processor instructs the communication module to transmit the one of the stored messages in at least one of the following communications protocols: IPv4, IPv6, Transmission Control Protocol (TCP/IP), User Datagram Protocol (UDP), Post Office Protocol (POP3), Internet Message Access Protocol (IMAP), Simple Mail Transfer Protocol (SMTP), Instant Messaging (IM), Short Message Service (SMS), and Bluetooth network encapsulation protocol (BNEP).

11. The haptic device of claim 8, wherein the processor instructs the communication module to transmit concurrently a plurality of messages for the signal received, wherein one of the plurality of messages is sent by the communication module using one wireless standard and one communication protocol, and another one of the plurality of messages is sent by the communication module using another wireless standard and another communication protocol.

12. A method for sending at least one message with a haptic device, the method comprising:
    capturing a movement of a user on a touchpad affixed to a housing and generating a signal corresponding to the captured movement;
    receiving by a processor located inside the housing the signal;
    analyzing by the processor the signal to determine a most probable corresponding message;
    instructing by the processor a communication module to transmit one of a plurality of stored messages corresponding to the captured movement, the one of the stored messages including at least one predetermined recipient address and a message for the recipient;
    concurrently transmitting by the communication module the most probably corresponding message using two different wireless standards.

13. A system for sending at least one message, the system comprising:
    a housing;
    a communication module located inside the housing;
    a memory storing messages corresponding to captured movements, each stored message including at least one predetermined recipient address and a message for the recipient;
    a touchpad affixed to the housing, the touchpad capturing a movement of a user and generating a signal corresponding to the captured movement;
    a processor located inside the housing, the processor receiving the signal, analyzing the signal to determine a most probable corresponding message, and instructing the communication module to transmit one of a plurality of stored messages corresponding to the captured movement, the most probable corresponding message being concurrently transmitted using two different wireless standards.

14. The system of claim 13, further comprising a USB port accessible through the housing, the USB port being used for recharging a battery of the system and/or configuration operation of the system.

15. The system of claim 13, wherein the memory stores configuration parameters for the captured movements, the configuration parameters including: the message to the recipient to be sent in the form of payload, a sender's identification and a recipient address.

16. The system of claim 15, wherein the sender identification at least one of the following: any type of information that is meaningful to the recipient; included in the payload; a unique sender's routable network address.

17. The system of claim 13, wherein the housing has one of the following shapes: cylindrical, cubic, triangular prism, hexagonal prism, cone, or any other three-dimensional shape which provides sufficient interior space for receiving the communication module, the processor, the memory, the touchpad and a battery.

18. The system of claim 13, further comprising:
a light module for providing a visual feedback to a user of the system;
a sound module for providing an audible feedback to a user of the system; and
wherein the configuration parameters stored by the memory further comprise configuration for the light module and the sound module for the captured movements.

19. The system of claim 13, wherein the most probable message is based on the signal received from the touchpad which comprises variations in pressure and relative position of the pressure variation measured by the touchpad.

20. The system of claim 18, wherein the processor further determines whether the signal received corresponds to more than one of the stored movement, and when the signal received corresponds to more than one of the stored movement the processor generates a visual feedback through the light module and/or an audible feedback through the sound module for a user to retry.

* * * * *